(12) United States Patent
Im et al.

(10) Patent No.: US 8,984,543 B2
(45) Date of Patent: Mar. 17, 2015

(54) BEAM CONTROLLING METHOD AND OPTICAL PICKUP DEVICE FOR PERFORMING THE METHOD

(71) Applicant: Toshiba Samsung Storage Technology Korea Corporation, Suwon-si (KR)

(72) Inventors: Ju-hee Im, Suwon-si (KR); Ki-bok Kim, Suwon-si (KR); Ji-sun Ahn, Seoul (KR); Chan-ik Lee, Suwon-si (KR); Jin-ho Jeong, Seoul (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 14/188,925

(22) Filed: Feb. 25, 2014

(65) Prior Publication Data

US 2014/0245331 A1 Aug. 28, 2014

(30) Foreign Application Priority Data

Feb. 25, 2013 (KR) ........................ 10-2013-0020026

(51) Int. Cl.
*G11B 17/02* (2006.01)
*G11B 7/1378* (2012.01)

(52) U.S. Cl.
CPC .............. *G11B 7/1378* (2013.01); *G11B 17/02* (2013.01)
USPC ..................... 720/601; 369/112.01

(58) Field of Classification Search
CPC .............................. G11B 7/1378; G11B 17/02
USPC ........... 720/601; 369/112.01, 112.03, 112.23, 369/44.23
See application file for complete search history.

(56) References Cited

U.S. PATENT DOCUMENTS

| | | | | |
|---|---|---|---|---|
| 5,134,288 | A * | 7/1992 | Van Dijck | 250/307 |
| 5,777,973 | A * | 7/1998 | Yoo et al. | 369/112.06 |
| 2001/0028625 | A1* | 10/2001 | Asada et al. | 369/112.24 |
| 2002/0071377 | A1* | 6/2002 | Ogata | 369/112.24 |
| 2010/0020324 | A1* | 1/2010 | Uchida | 356/369 |

FOREIGN PATENT DOCUMENTS

| | | |
|---|---|---|
| JP | 2003-317302 A | 11/2003 |
| KR | 1997-0007871 A | 2/1997 |
| KR | 1998-030385 A | 7/1998 |
| KR | 10-0269105 B1 | 7/2000 |

* cited by examiner

*Primary Examiner* — Allen T Cao
(74) *Attorney, Agent, or Firm* — NSIP Law

(57) ABSTRACT

Provided is an optical pickup device that compensates for an aberration caused by a beam splitter. When a beam of light is reflected from a disc and proceeds towards a beam splitter, the beam splitter is designed to allow the reflected beam to pass therethrough. However, the beam splitter can cause an astigmatism in the reflected beam due to diffraction. According to various aspects herein, an optical pickup device may include a compensation device that generates an inverse astigmatism to compensate for the astigmatism generated by the beam splitter.

19 Claims, 5 Drawing Sheets

BEAM CONTROLLING METHOD AND OPTICAL PICKUP DEVICE FOR PERFORMING THE METHOD

CROSS-REFERENCE TO RELATED APPLICATION(S)

This application claims the benefit under 35 USC §119(a) of Korean Patent Application No. 10-2013-0020026, filed on Feb. 25, 2013, in the Korean Intellectual Property Office, the entire disclosure of which is incorporated herein by reference for all purposes.

BACKGROUND

1. Field

The following description relates to a method and apparatus for compensating for an astigmatism generated due to a beam splitter and an optical pickup device employing the method.

2. Description of Related Art

In an optical pickup device, a path of a light beam from a light source and a path of a light beam reflected from a disc partially overlap with each other in some section. The paths typically overlap with each other within a space between a disc and a beam splitter, and the beam splitter splits the paths into the beam from the light source and the beam from the disc. In particular, the beam splitter causes the beam from the light source to proceed toward the disc, and the beam reflected from the disc to proceed toward a photodetector.

The beam splitter is typically a plate-shaped member that reflects a source beam emitted from a light source to a disc, and transmits a modulated beam or a modulated and reflected beam that is modulated by a recording surface of the disc. While the beam reflected from the disc is transmitted through the beam splitter, the reflected beam is refracted by a first surface facing the disc and a second surface opposite to the first surface. Here, an astigmatism may be generated due to the refraction. Conventionally, however, a sensing lens having a concave shape is used to adjust a spot size of the modulated beam with respect to the light receiving device, without consideration of the astigmatism generated by the beam splitter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an aspect, there is provided a beam controlling method including directing, by a beam splitter, a source beam to be incident to a disc and transmitting therethrough a reflected beam that is modulated by a recording surface of the disc after being incident to the disc, compensating for an astigmatism that is generated due to refraction while the reflected beam is transmitted through the beam splitter, the compensating being performed by a plate-shaped device that generates an inverse astigmatism, and transmitting the astigmatism-compensated reflected beam to a light receiving device.

The plate-shaped device may comprise a refractive index that is the same as a refractive index of the beam splitter.

The plate-shaped device may be formed of a material that is the same as a material forming the beam splitter.

The beam splitter may be inclined with respect to a proceeding path of the reflected beam, and the plate-shaped device is inclined in a direction that is opposite to the direction in which the beam splitter is inclined, with respect to the proceeding path of the reflected beam.

The reflected beam that is transmitted through the plate-shaped device may be directly incident to the light receiving device.

The astigmatism-compensated reflected beam may be transmitted directly incident to the light receiving device.

During the compensating, the plate-shaped device may not apply power to a beam flux of the reflected beam.

During the compensating, the plate-shaped device may compensate for the astigmatism without adjusting a position of the plate-shaped device.

In an aspect, there is provided an optical pickup device including a light source configured to generate a source beam, an objective lens configured to focus the source beam on a disc, a light receiving device to which a reflected beam from the disc is incident, a beam splitter configured to direct the source beam towards the disc and transmit the reflected beam toward the light receiving device, and a compensation device disposed between the beam splitter and the light receiving device, and being configured to generate an inverse astigmatism to compensate for an astigmatism generated by diffraction when the reflected beam transmits through the beam splitter.

The compensation device may comprise a plate-shaped device that has a refractive index that is the same as a refractive index of the beam splitter.

The compensation device may comprise a plate-shaped device that is formed of a material that is the same as a material forming the beam splitter.

The beam splitter may be inclined with respect to a path of the reflected beam, and the compensation device may be inclined in a direction that is opposite to the direction, in which the beam splitter is inclined, with respect to the path of the reflected beam.

The compensation device may directly face the light receiving device such that the reflected beam transmitting through the aberration compensation device is directly incident to the light receiving device.

The compensation device may be configured to compensate for the aberration in the reflected beam caused by the beam splitter without applying power to a beam flux of the reflected beam.

The compensation device may be configured to compensate for the aberration while in a fixed position and without adjusting a position of the compensation device.

The compensation device may be configured to remove the astigmatism generated by the beam splitter, but not remove an astigmatism intentionally included in the reflected beam.

In an aspect, there is provided an optical disc drive, including a tray configured to receive an optical disc, and an optical pickup comprising a beam splitter configured to direct a source beam towards the optical disc and transmit a reflected beam from the optical disc toward a detector, and a compensation device disposed between the beam splitter and the detector and configured to compensate for an astigmatism generated by diffraction when the reflected beam transmits through the beam splitter.

The compensation device may comprise a plate-shaped device that is configured to compensate for the aberration in the reflected beam caused by the beam splitter without applying power to a beam flux of the reflected beam.

The compensation device may comprise a plate-shaped device that is configured to compensate for the aberration while in a fixed position and without adjusting a position of the compensation device.

Other features and aspects will be apparent from the following detailed description, the drawings, and the claims.

Figure 1:
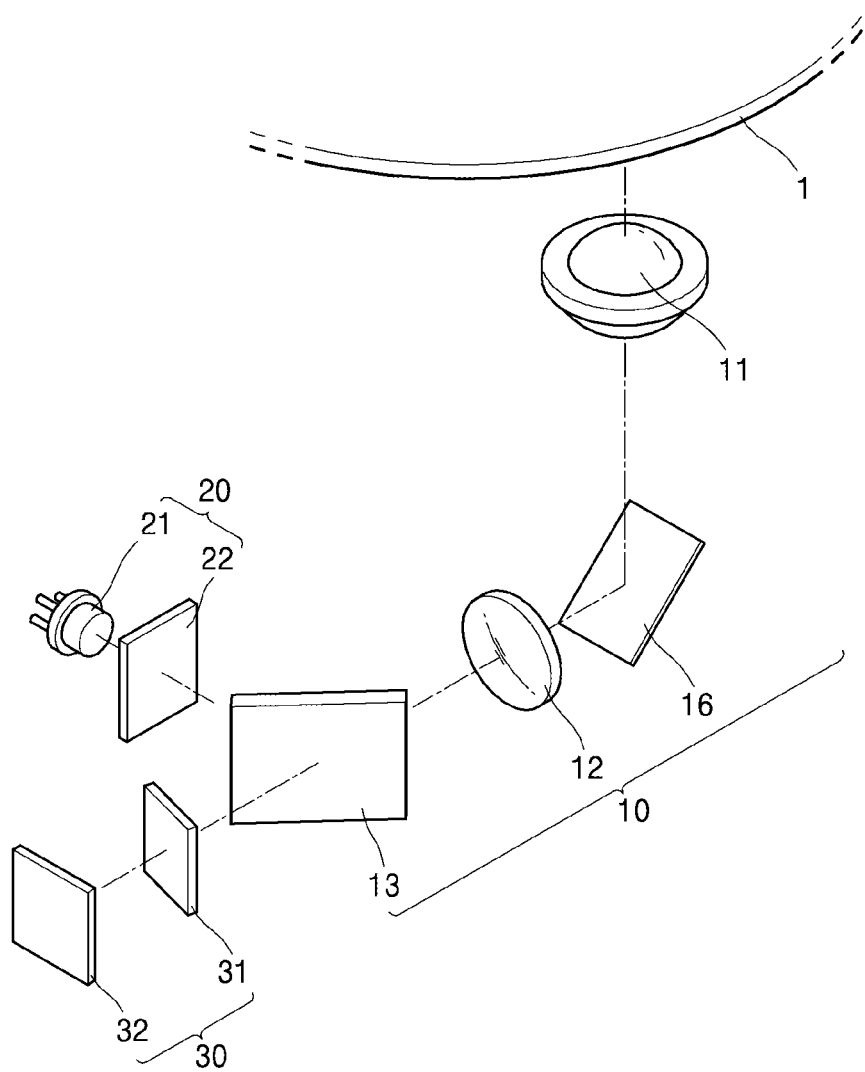
FIG. 1 is a diagram illustrating an example of an optical pickup device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, examples of a method of controlling a beam and an optical pickup device employing the method are described with reference to accompanying drawings.

Figure 2:
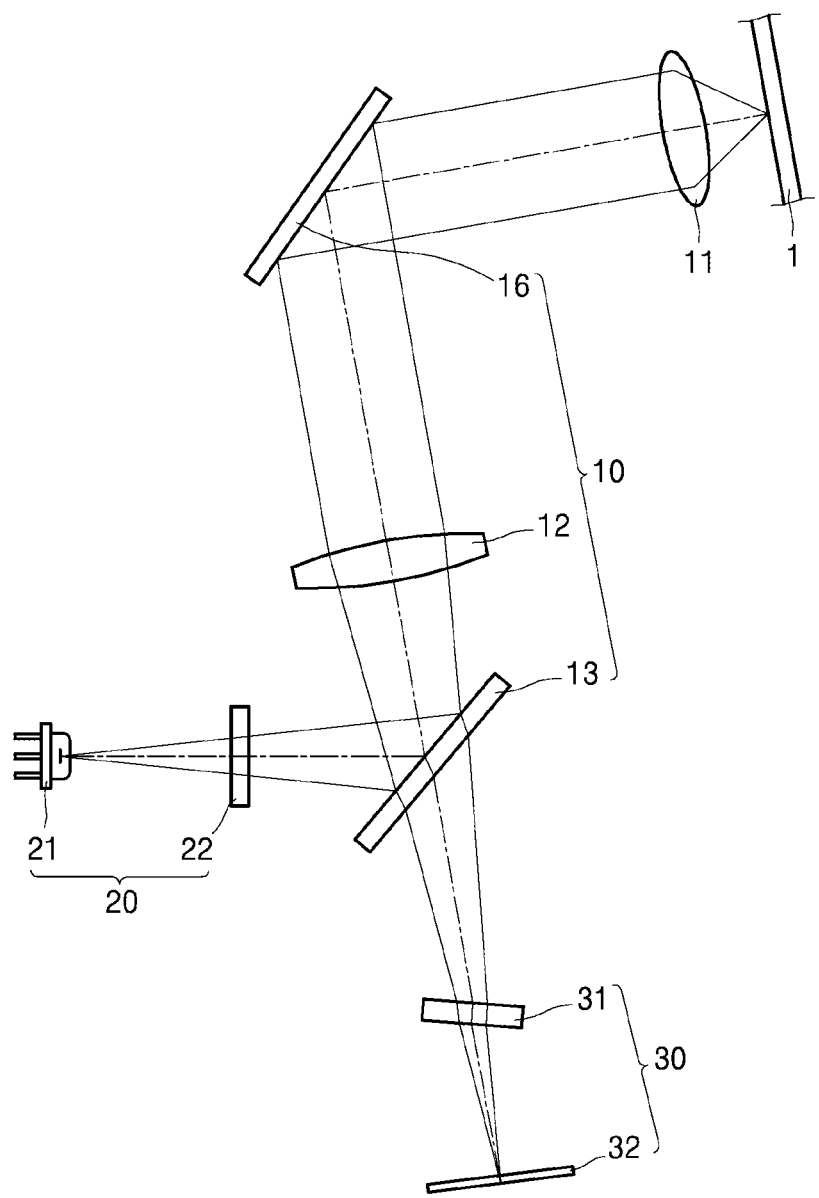
FIG. 2 is a diagram illustrating another example of the optical pickup device.

FIG. 1 illustrates a three-dimensional (3D) example of an optical pickup device that supports multiple types of media, and FIG. 2 illustrates an example of a sided view of the optical pickup device of FIG. 1. For example, the optical pickup device may be included in an optical disc drive, for example, a game console, a Blu-ray player, and CD/DVD player, and the like.

Referring to FIGS. 1 and 2, the optical pickup device includes a transmission system 10, a light source system 20, and a light receiving system 30. The light source system 20 includes a light source 21 generating a source beam L1, and a grating element 22 generating multiple beams by diffracting the source beam. For example, the grating element 22 may generate three beams.

The transmission system 10 transmits the source beam L1 emitted from the light source system 20 toward an optical disc 1, and transmits a reflected beam reflected by the optical disc 1 toward the light receiving system 30. The transmission system 10 includes a beam splitter 13 that directs or reflects the source beam L1 emitted from the light source system 20 toward the optical disc 1 (or a medium) and transmits therethrough a modulated beam or reflected beam L2 emitted from the optical disc 1 toward the light receiving system 30. In this example, the transmission system 10 also includes a collimating lens 12 forming the source beam L1 as parallel light, and an objective lens 11 for focusing the source beam on a recording surface of the optical disc 1. The transmission system 10 may also include one or more mirrors 16 for changing an optical path.

Figure 3:
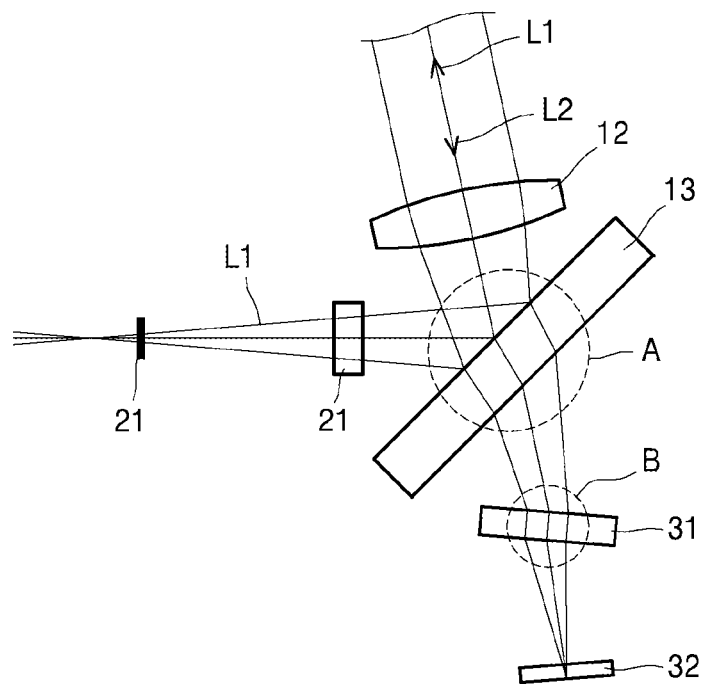
FIG. 3 is a diagram illustrating an example of paths of a source beam and a reflected beam in an optical system based on a beam splitter in an optical pickup device.
Figure 4:
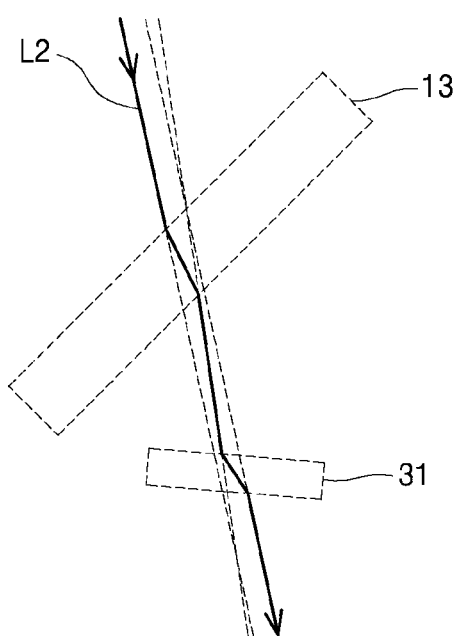
FIG. 4 is a diagram illustrating an example of a process of compensating for an astigmatism in the optical pickup device of FIG. 3.

According to various aspects herein, the light receiving system 30 includes a light receiving device 32 and an aberration compensation device 31. The aberration compensation device 31 may be used to compensate for or offset an aberration such as an astigmatism of the reflected beam L2 generated by the beam splitter 13. An example of the compensation is further described with reference to FIGS. 3 and 4. FIG. 3 illustrates an example of processing paths of the source beam L1 and the reflected beam L2 in the optical system including the beam splitter 13, and FIG. 4 illustrates an example of a variation in the proceeding path of the reflected beam L2 which is used to compensate for an aberration.

The modulated beam or the reflected beam L2 reflected by the disc is transmitted through the beam splitter 13. In other words, the beam splitter 13 is designed to enable the reflected beam L2 to pass therethrough. However, a refractive region or an aberration generation region A is generated when the reflected beam L2 passes through the beam splitter 13. An optical axis of the reflected beam L2 that is transmitted through the aberration generation region A is refracted in a direction that is different from the optical axis in the transmission system 10, and thus, an astigmatism occurs. According to various aspects, the aberration compensation device or a plate-shaped device 31 is configured to remove the aberration component that is generated when the beam is transmitted through the beam splitter 13. For example, the compensation device 31 may be used to replace a conventional sensing lens.

Typically, the conventional sensing lens has a negative power. As a result, the conventional sensing lens requires a movable structure for compensating for the aberration. However, the aberration compensation device 31 according to various aspects may not have an optical power. Accordingly, there is no need to move the aberration compensation device 31, and thus, the aberration compensation device 31 may be fixed on a set location. For example, the aberration compensation device 31 may not apply any power to a beam flux of the reflected beam incident to the aberration compensation device 31.

According to various aspects, an inverse astigmatism corresponding to the astigmatism generated by the beam splitter 13 is generated in a refraction region or an aberration generation region B of the aberration compensation device 31 which may be used to offset the astigmatism generated by the beam splitter 13. For example, a proceeding axis of the reflected beam L2 refracted by the beam splitter 13 in the light receiving system 30 is refracted by the aberration compensation device 31 to be parallel with an optical axis of the transmission system 10. Accordingly, an appropriate beam spot may be formed by the light receiving device 32 by the reflected beam L2, the aberration of which is compensated for. For example, the aberration compensation device 31 may not remove the aberration that is intentionally given to the reflected beam by using an astigmatic method, but instead may remove an astigmatism component generated only by the beam splitter 13. As an example, the aberration compensation device 31 may be formed of a material that is the same as the material forming the beam splitter 13.

The above described optical pickup device may have a general CD/DVD structure. To do this, the light source 21 may include a twin laser diode package structure including light emitting diodes for CD/DVD. Accordingly, the light receiving device 32 may have a light receiving cell arrangement structure corresponding to the CD/DVD.

Also, the optical pickup device has a three-beam type structure, which may be corrected as a one-beam type structure. In this case, the grating element 22 may be removed in the above case, and the light receiving device may have a well known one-beam type light receiving cell arrangement structure, for example, a structure disclosed in Korean Patent Application No. 10-2010-0118104 which is incorporated herein by reference for all purposes.

Figure 5:
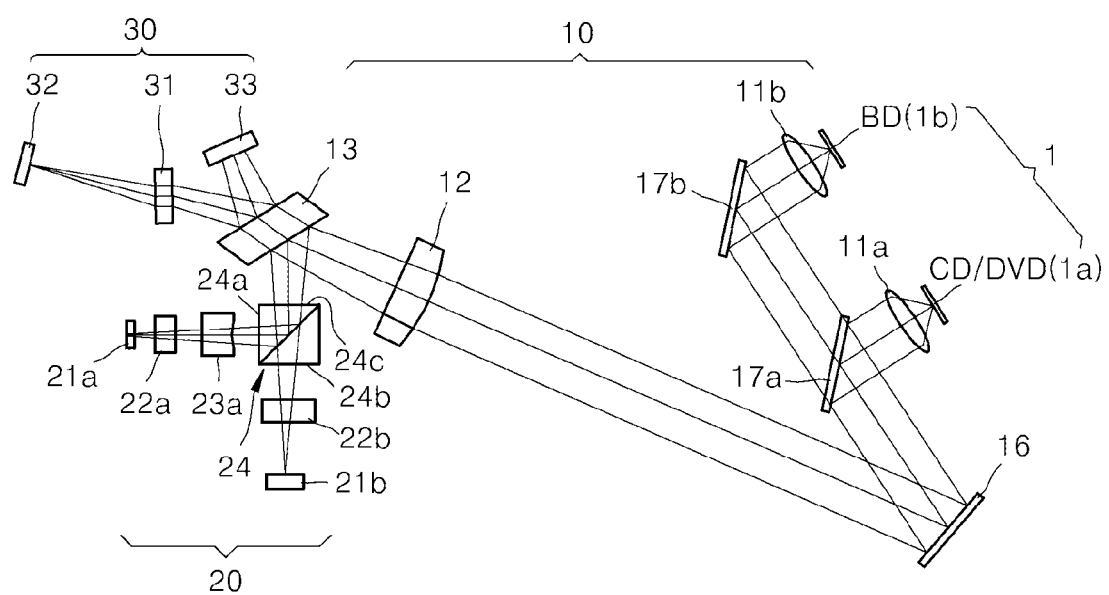
FIG. 5 is a diagram illustrating another example of an optical pickup device.

FIG. 5 illustrates another example of an optical pickup device corresponding to CD/DVD and Blu-ray (BD).

Referring to FIG. 5, the optical pickup device includes a transmission system 10 corresponding to media 1, 1a, and 1b, a light source system 20 providing a light beam for reproducing and/or recording information from/to the media 1, 1a, and 1b, and a light receiving system for receiving a light beam reflected from the media 1, 1a, and 1b.

In this example, the light source system 20 includes a first light source 21a for BD, a first grating element 2a for BD, a coupling lens 23a, a second light source 21b for CD/DVD, a second grating element 22b for CD/DVD, and a first beam splitter 24. The first beam splitter 24 has a cubic structure. A beam from the first light source 21a and a beam from the second light source 21b are incident to a first surface 24a and a second surface 24b, respectively, that are adjacent to each other, and the beams from the first and second light sources 21a and 21b are commonly emitted from a third surface 24c facing the second surface 24b and are incident to a second beam splitter 13 that is further described herein. The coupling lens 23a adjusts an optical magnification between the first light source 21a and the first beam splitter 24, for example, a defocusing amount of the processing light beam, so as to adjust an optical distance between the first light source 21a to the media 1, 1a, and 1b.

The first and second grating elements 22a and 22b modulate the single beams from the first and second light sources 21a and 21b into a main beam and ±1st order sub-beams through a diffraction effect. The main beam and the sub-beams have a polarization component of a first direction (hereinafter, first polarization) and a polarization component of a direction different from the first direction, that is, a second direction perpendicular to the first direction (hereinafter, second polarization). The grating elements 22a and 22b may change intervals between the main beam and the sub-beams according to an interval or a period between the gratings thereof.

In this example, the transmission system 10 includes an optical path refraction mirror 16 for refracting a path of the beam incident from the second beam splitter 13, a dichroic mirror 18a located on a path of the beam reflected from the optical path refraction mirror 16 to reflect a beam of a wavelength for CD/DVD and to transmit the beam for BD, and a full-reflective mirror 18b reflecting the beam for BD that has been transmitted through the dichroic mirror 18a. A first objective lens 11a for BD is located on a path of the beam reflected from the full-reflective mirror 18b, and a second objective lens 11b for CD/DVD is located on a path of the beam reflected from the dichroic mirror 18a.

According to various aspects, the light receiving system 30 includes the aberration compensation device 31 and the light receiving device 32, as previously described above. In this example, the light receiving system 30 also includes a monitoring photodetecting device 33 which may be referred to as a front photo detector (FPD) for directly receiving a part of the source beam emitted from the light source system 20.

The light receiving device 32 and the light sources 21a and 21b may be connected to a radio frequency (RF) amplifier and a laser diode driver (LDD) provided in an optical disc driver. The light receiving device 32 may receive the reflected beam or the modulated beam modulated by a recording surface of a medium, and may receive electric signals such as an RF signal and a tracking error signal (TES) signal when an internal electronic characteristic is changed according to variation in a light receiving amount of the incident beam.

The optical pickup device shown in FIG. 5 may be changed to have the one-beam type structure as described above.

Figure 6:
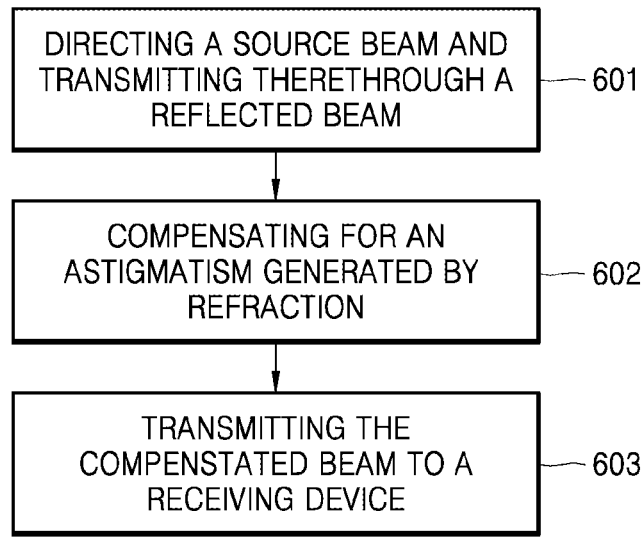
FIG. 6 is a diagram illustrating an example of a method of compensating for an astigmatism.

FIG. 6 illustrates an example of a method of compensating for an astigmatism that may be performed in an optical pickup.

Referring to FIG. 6, the method includes directing a source beam to be incident to a disc and transmitting therethrough a reflected beam that is modulated by a recording surface of the disc after being incident to the disc, in 601. For example, the directing and transmitting may be performed by a plate-shaped beam splitter. Next, an astigmatism that is generated due to a refraction while the reflected beam is transmitted through the beam splitter, is compensated for by generating an inverse astigmatism, in 602. The astigmatism-compensated reflected beam is then transmitted to a light receiving device, in 603.

According to various aspects, an astigmatism generated due to the beam splitter may be compensated for or offset such that a beam spot of high quality may be formed on a light receiving device. The compensation of the astigmatism may be performed by a plate-shaped member that may replace a conventional sensing lens. Thus, the optical pickup device may have a simplified and more efficient structure, and assembling processes of the optical pickup device may be simplified. In addition, the plate-shaped member may compensate for the astigmatism without its location being moved or adjusted, in contrast to a sensing lens that requires adjustment to compensate for an astigmatism. Thus, the optical pickup device may have less components than those of the conventional art.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A beam controlling method comprising:
   directing, by a beam splitter, a source beam to be incident to a disc and transmitting therethrough a reflected beam that is modulated by a recording surface of the disc after being incident to the disc;
   compensating for an astigmatism that is generated due to refraction while the reflected beam is transmitted through the beam splitter, the compensating being performed by a plate-shaped device that generates an inverse astigmatism; and
   transmitting the astigmatism-compensated reflected beam to a light receiving device.

2. The beam controlling method of claim 1, wherein the plate-shaped device comprises a refractive index that is the same as a refractive index of the beam splitter.

3. The beam controlling method of claim 1, wherein the plate-shaped device is formed of a material that is the same as a material forming the beam splitter.

4. The beam controlling method of claim 1, wherein the beam splitter is inclined with respect to a proceeding path of the reflected beam, and the plate-shaped device is inclined in a direction that is opposite to the direction in which the beam splitter is inclined, with respect to the proceeding path of the reflected beam.

5. The beam controlling method of claim 1, wherein the reflected beam that is transmitted through the plate-shaped device is directly incident to the light receiving device.

6. The beam controlling method of claim 1, wherein the astigmatism-compensated reflected beam is transmitted directly incident to the light receiving device.

7. The beam controlling method of claim 1, wherein, during the compensating, the plate-shaped device does not apply power to a beam flux of the reflected beam.

8. The beam controlling method of claim 1, wherein, during the compensating, the plate-shaped device compensates for the astigmatism without adjusting a position of the plate-shaped device.

9. An optical pickup device comprising:
   a light source configured to generate a source beam;
   an objective lens configured to focus the source beam on a disc;
   a light receiving device to which a reflected beam from the disc is incident;
   a beam splitter configured to direct the source beam towards the disc and transmit the reflected beam toward the light receiving device; and
   a compensation device disposed between the beam splitter and the light receiving device, and being configured to generate an inverse astigmatism to compensate for an astigmatism generated by diffraction when the reflected beam transmits through the beam splitter.

10. The optical pickup device of claim 9, wherein the compensation device comprises a plate-shaped device that has a refractive index that is the same as a refractive index of the beam splitter.

11. The optical pickup device of claim 9, wherein the compensation device comprises a plate-shaped device that is formed of a material that is the same as a material forming the beam splitter.

12. The optical pickup device of claim 9, wherein the beam splitter is inclined with respect to a path of the reflected beam, and the compensation device is inclined in a direction that is opposite to the direction, in which the beam splitter is inclined, with respect to the path of the reflected beam.

13. The optical pickup device of claim 12, wherein the compensation device directly faces the light receiving device such that the reflected beam transmitting through the aberration compensation device is directly incident to the light receiving device.

14. The optical pickup device of claim 9, wherein the compensation device is configured to compensate for the aberration in the reflected beam caused by the beam splitter without applying power to a beam flux of the reflected beam.

15. The optical pickup device of claim 9, wherein the compensation device is configured to compensate for the aberration while in a fixed position and without adjusting a position of the compensation device.

16. The optical pickup device of claim 9, wherein the compensation device is configured to remove the astigmatism generated by the beam splitter, but not remove an astigmatism intentionally included in the reflected beam.

17. The optical pickup device of claim 9, wherein the compensation device comprises a plate-shaped device that is configured to compensate for the aberration while in a fixed position and without adjusting a position of the compensation device.

18. An optical disc drive, comprising:
   a tray configured to receive an optical disc; and
   an optical pickup comprising a beam splitter configured to direct a source beam towards the optical disc and transmit a reflected beam from the optical disc toward a detector, and a compensation device disposed between the beam splitter and the detector and configured to compensate for an astigmatism generated by diffraction when the reflected beam transmits through the beam splitter.

19. The optical disc drive of claim 18, wherein the compensation device comprises a plate-shaped device that is configured to compensate for the aberration in the reflected beam caused by the beam splitter without applying power to a beam flux of the reflected beam.

* * * * *